Sept. 20, 1966    E. W. SPEARS, JR    3,273,345
GAS TURBINE ENGINE
Filed Sept. 10, 1963    2 Sheets-Sheet 1

INVENTOR.
Esten W. Spears, Jr.
BY
Paul Fitzpatrick
ATTORNEY

Sept. 20, 1966   E. W. SPEARS, JR   3,273,345
GAS TURBINE ENGINE

Filed Sept. 10, 1963   2 Sheets-Sheet 2

INVENTOR.
Esten W. Spears, Jr.
BY
Paul Fitzpatrick
ATTORNEY

# United States Patent Office 3,273,345
Patented Sept. 20, 1966

3,273,345
GAS TURBINE ENGINE
Esten W. Spears, Jr., Indianapolis, Ind., assignor to General Motors Corporation, Detroit, Mich., a corporation of Delaware
Filed Sept. 10, 1963, Ser. No. 307,904
4 Claims. (Cl. 60—35.6)

My invention is directed to gas turbine engines of the by-pass type, which ordinarily are jet engines but which may be propeller-driving engines. The by-pass engine typically comprises in coaxial arrangement for flow through them in series, a first or low pressure compressor, a second or high pressure compressor, combustion apparatus, a first or high pressure turbine coupled to the second compressor to drive it, a second or low pressure turbine connected to the low pressure compressor to drive it, and an exhaust pipe terminating in a nozzle for discharge of the combustion products. Typically, the combustion products are discharged at high velocity to propel a vehicle. A by-pass duct extends from the first compressor to the exhaust pipe and typically conducts a considerably greater air flow than that passing through the turbines.

The entrance to the by-pass duct may be at the high pressure end of the first compressor, or it may be at an intermediate stage. In some engines, sometimes referred to as by-pass engines, but more accurately termed ducted fan engines, the by-pass duct discharges independently of the exhaust pipe. There are significant advantages, however, to engines in which the by-pass flow is mixed with the turbine exhaust, and the resultant gas under pressure is discharged through a single propulsion nozzle.

My invention is concerned with improvement of by-pass engines having the common discharge, and lies in structure for mixing the two streams, the by-pass air flow and the turbine exhaust gas. The mixer according to my invention provides thorough admixture of the two streams with a minimum of friction or turbulence losses and, additionally, provides for variable valving or throttling of the by-pass flow. This throttling is important because it provides a means to balance the loads on the two turbines and thus provide for efficient and harmonius operaton of the two-spool engine, and provides for control of the speed of the low pressure spool (first compressor and second turbine) independently of the control of the high pressure spool (second compressor and first turbine). Control of the high pressure spool speed is ordinarily by variation of fuel flow. However, this provides no direct control of the relative speeds of the two spools or direct control of the low pressure spool. Control or valving of the by-pass duct can vary the load on the low pressure spool and thus the speed of the low pressure spool. It is to be understood, however, that my invention is not directed to the control but rather to improved engine structure.

The principal objects of my invention are to improve by-pass turbine engines, to provide a highly suitable variable mixer for such engines, and to provide a structural arrangement of the by-pass duct, mixer, and exhaust pipe advantageous to the operational reliability of such engines.

The nature of the invention will be clear to those skilled in the art from the succeeding detailed description of the preferred embodiment of the invention and the accompanying drawings thereof.

Figure 1:
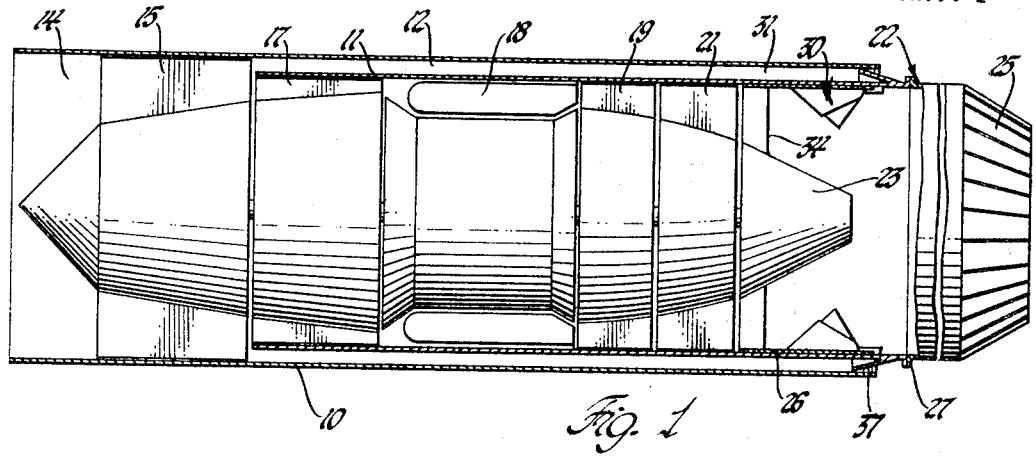
FIGURE 1 is a schematic axial section of a two-spool by-pass engine illustrating the location of the mixer.

Referring first to FIGURE 1, a typical by-pass engine is illustrated rather schematically. The engine includes an outer annular shell 10 and an inner annular shell 11 concentric with the outer shell and defining with it the by-pass duct 12. The outer shell defines the engine air inlet 14, and houses the first or low pressure compressor 15. The output of this compressor is divided between the by-pass duct 12 and the second or high pressure compressor 17. The high pressure compressor discharges through combustion apparatus 18 into a first or high pressure turbine 19 connected by a suitable driving shaft to the high pressure compressor. The discharge from this turbine energizes the low pressure turbine 21 connected by a shaft to the low pressure compressor. The low pressure turbine discharges into an exhaust passage defined by the exhaust pipe 22, which is a continuation of the inner shell 11, and a tail cone 23. The exhaust duct terminates in any suitable variable jet propulsion nozzle 25. The exhaust pipe may be considered as having an upstream section 26 immediately adjacent the turbines and a downstream section 27. The variable mixer 30 structurally connects the two sections. It also provides for air flow from the annulus 31 at the rear end of the by-pass duct into the interior of the exhaust pipe.

Figure 2:
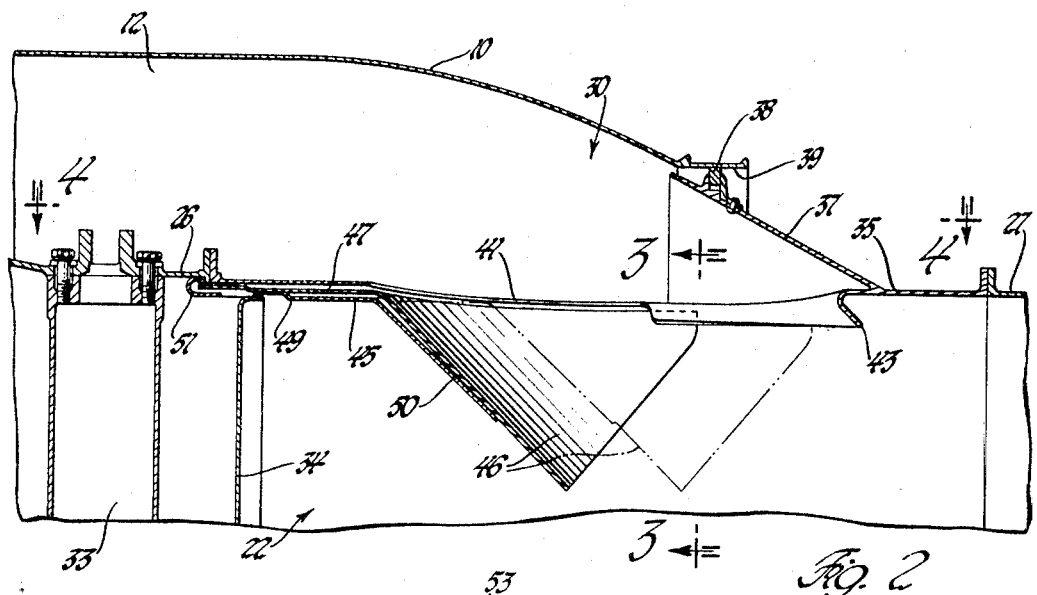
FIGURE 2 is a partial sectional view taken on a plane containing the axis of the engine.

Proceeding now to the preferred structure of the mixer as shown in FIGURES 2 to 6, the upstream and downstream sections 26 and 27 of the exhaust pipe are indicated in FIGURE 2. The upstream section 26 may be the terminal part of a turbine case. As illustrated, struts 33 extend inwardly from the case to support the turbine shaft bearing (not shown) and a strut fairing 34 extends inwardly to the tail cone 23. A cylindrical casing section or shroud 35 forming part of the mixer also forms a portion of the exhaust pipe, interconnecting the sections 26 and 27, and physically connected to them at the bolting flanges illustrated. A conical ring 37 integral with the shroud 35 mounts a yieldable seal 38 of a piston ring type, which slidably cooperates with a ring 39 fixed to the end of the outer case 10 defining the outer wall of the by-pass duct 12. The ring 39 can slide axially on the seal 38, and the seal is yieldable radially, this structure compensating for relative expansion of parts of the engine. This is desirable, and it is possible because the mixer structure of the invention provides a load-carrying structure between the turbine case 26 and the remainder of the exhaust pipe.

The ring or shroud 35 is cut out to define a number, preferably ten, of openings 41 through which the by-pass air is discharged into the exhaust pipe 22. The material of the shroud 35 is formed to define a flange 43 at the rear edge of openings 41.

A second shroud ring 45 is disposed within and closely adjacent to the shroud ring 35. The second shroud ring, which is movable relative to the first, is formed to provide a chute 46 at each opening 41, and may be termed a movable chute ring. In FIGURE 2, the chute ring is illustrated in its forward position which allows an unimpeded flow of by-pass air, and is movable to the position indicated by the broken lines in which the openings 41 are throttled by something like one-third. More specifically, the chute ring 45 is formed of a radially outer sheet metal ring 47 which defines the chutes 46, and a radially inner ring 49 which comprises portions 50 partially overlying the chutes. The forward edge of the ring 47 is received within a channel 51 fixed to the section 26 when the ring is in its forward or open position.

Figure 3:
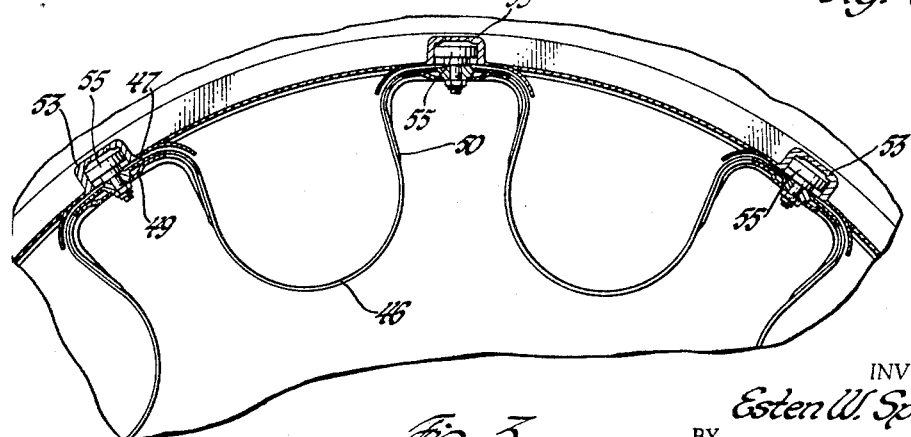
FIGURE 3 is a transverse sectional view taken on the plane indicated by the line 3—3 in FIGURE 2.
Figure 4:
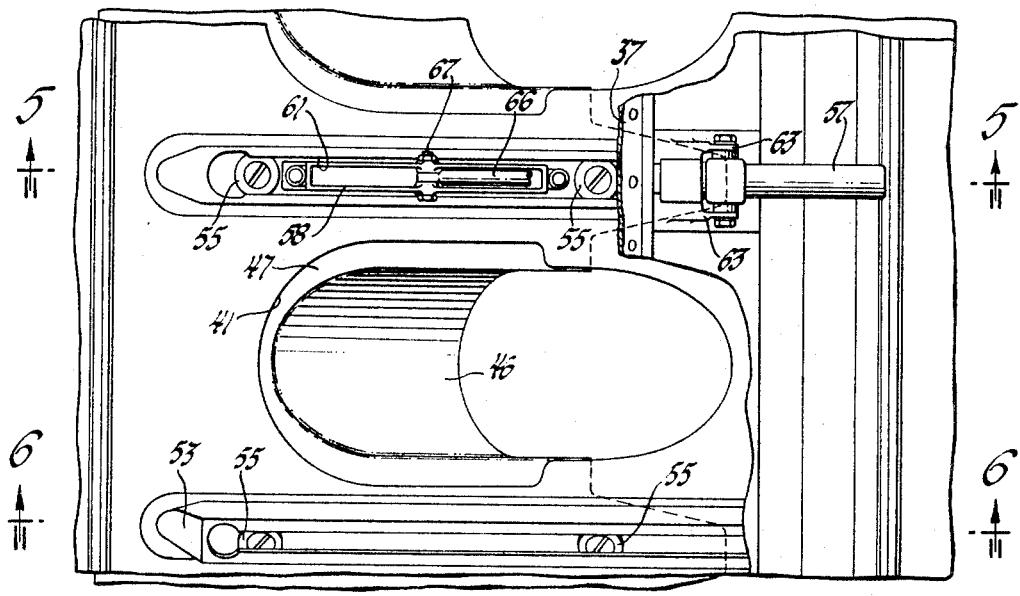
FIGURE 4 is a plan view, with parts cut away, as indicated by the line 4—4 in FIGURE 2.
Figure 5:
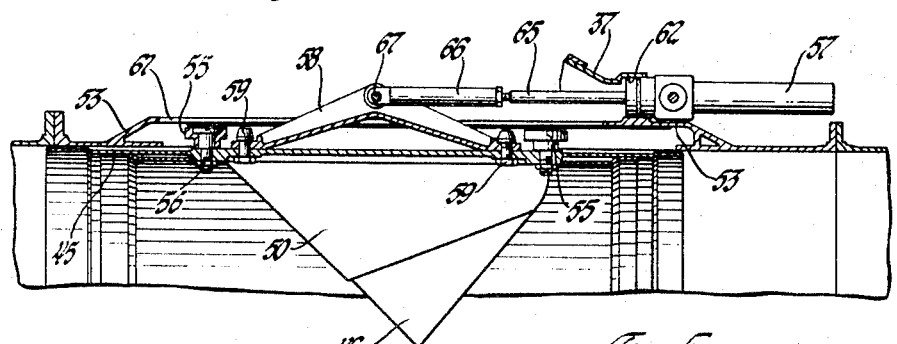
FIGURE 5 is a sectional view on a plane containing the axis of the engine as indicated by the line 5—5 in FIGURE 4.
Figure 6:
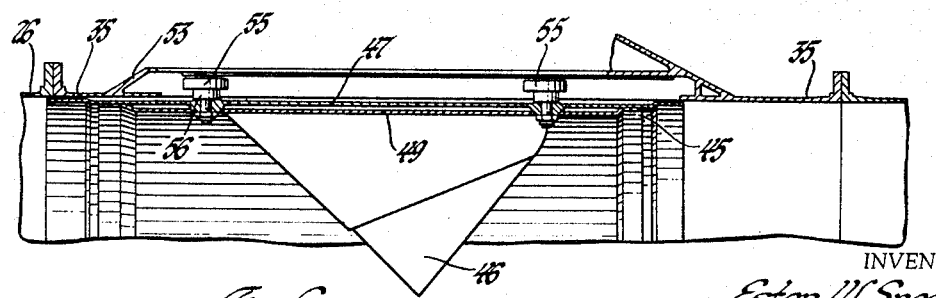
FIGURE 6 is a sectional view on a plane containing the axis of the engine as indicated by the line 6—6 in FIGURE 4.

As seen more clearly in FIGURES 3 and 6, a number, specifically ten in the embodiment here described, of channel section struts 53 extend axially of the engine. These struts are fixed to the forward and rear edges of the outer shroud 35. These struts provide the load-carrying structure between the case 26 and the rear section 27 of the exhaust pipe. They also provide tracks for rollers 55 which guide the chute ring in its axial movement. As will be apparent, the rollers 55 are guided between the radial walls of the channels 53 and are mounted on spindles 56 fixed in bodies welded to the plates 47 and 49. Rollers are shown in each track, but they may be omitted from some of the tracks. The chute ring 45 is reciprocated by actuators 57 connected to it. Preferably, there are two actuators connected at diametrically opposite points on the ring. The mounting of such an actuator and its connection to the ring is illustrated in FIGURES 4 and 5. A bracket 58 fixed to chute ring 45 by bolts 59 extends through the slot 61 in the strut 53. The actuator 57, which may be a hydraulic cylinder, a screw jack, or other suitable device, is piloted into a socket 62 in the flange 37 and bolted to ears 63 extending from the flange 37. The actuator includes a reciprocating rod 65 adjustably connected to a link 66 connected by bolt 67 to the bracket 58. Any suitable mechanism may be employed to operate the actuators. These may be controlled to suit the regime of operation of the engine, as, for example, by means responsive to the speed of the low pressure spool or to deviation of speed of the low pressure spool from a speed scheduled in connection with the setting of the speed of the high pressure spool. As is apparent, the axial movement of the inner shroud or chute ring provides a substantial restriction of the discharge openings from the by-pass duct into the exhaust pipe without any significant disturbance of smooth flow. The mixing function is accomplished by the radial component of motion of the by-pass air which causes it to be fed into the combustion productions and give a relatively even distribution of the two streams, which provides a substantially uniform gas mixture as the flow proceeds through the exhaust pipe to the jet nozzle.

The structure provides a strong interconnection of the inner case of the engine with the exhaust pipe, and provides a floating mounting for the by-pass duct wall which does not have as great a range of temperature as the hot engine case and, therefore, has much less thermal expansion.

It will be apparent that many modifications of the structure exemplified by the preferred embodiment may be made without departing from the invention.

I claim:
1. A by-pass gas turbine engine comprising, in combination, first and second compressors, combustion apparatus, and first and second turbines, each turbine being connected to drive one of the compressors, an exhaust pipe from the second turbine, a by-pass duct extending from the first compressor to the exhaust duct, the duct terminating in an annulus extending around the pipe,
    and a variable mixer connecting the said duct to the said pipe including
    means defining a plurality of openings from the annulus into the pipe,
    a chute ring disposed around the pipe and having apertures registerable with the said openings,
    mixing chutes extending from the chute ring into the duct disposed so that the apertures are in the lee of the chutes,
    and means to shift the chute ring so as to variably obstruct the passages defined by cooperation of the said openings and apertures and thus variably throttle the by-pass duct.
2. An engine as recited in claim 1 in which the exhaust pipe has an upstream section and a downstream section axially spaced from the upstream section,
    and the variable mixer provides a structural connection between the said sections,
    and including a floating sealed connection between the by-pass duct and the downstream section of the exhaust pipe.
3. A by-pass gas turbine engine comprising, in combination, a gas generator, an exhaust pipe receiving the discharge of the gas generator, a by-pass duct discharging into the exhaust pipe:
    the exhaust pipe having an upstream section and a downstream section axially spaced from the upstream section,
    a variable mixer connecting the by-pass duct to the exhaust pipe for air flow into the pipe and structurally connecting the said sections, including
    struts extending axially of the exhaust pipe and spaced circumferentially of the pipe,
    a first shroud extending between the sections,
    a second shroud movable relative to the first extending between the sections,
    registering openings in the shrouds valving by-pass flow in response to relative movement of the shrouds,
    mixing chutes extending into the exhaust pipe from one of the shrouds, and
    means mounting one of the shrouds on the said struts for movement axially of the pipe.
4. A by-pass gas turbine engine comprising, in combination, a gas generator, an exhaust pipe receiving the discharge of the gas generator, a by-pass duct discharging into the exhaust pipe; the exhaust pipe having an upstream section and a downstream section axially spaced from the upstream section,
    a variable mixer connecting the by-pass duct to the exhaust pipe for air flow into the pipe and structurally connecting the said sections, including
    struts extending axially of the exhaust pipe and spaced circumferentially of the pipe,
    a first shroud extending between the sections,
    a second shroud movable relative to the first extending between the sections,
    registering openings in the shrouds valving by-pass flow in response to relative movement of the shrouds,
    mixing chutes extending into the exhaust pipe from one of the shrouds,
    means mounting one of the shrouds on the said struts for movement axially of the pipe,
    and a floating sealed connection between the by-pass duct and the downstream section of the exhaust pipe.

References Cited by the Examiner

UNITED STATES PATENTS

| 3,060,680 | 10/1962 | Wilde et al. | 60—35.6 |
| 3,115,748 | 12/1963 | Wilde et al. | 60—35.6 |
| 3,150,484 | 9/1964 | Oldfield | 60—35.6 |

FOREIGN PATENTS

| 1,306,025 | 9/1962 | France. |
| 1,148,817 | 4/1963 | Germany. |
| 871,016 | 6/1961 | Great Britain. |
| 924,331 | 4/1963 | Great Britain. |

MARK NEWMAN, *Primary Examiner.*

D. HART, *Assistant Examiner.*